DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 20, 1971

888 O.G. 704

T888,002

PROCESS FOR DYEING AROMATIC POLYAMIDE FIBERS FROM A PHOSPHATE SURFACTANT BENZALDEHYDE CONTAINING DYEBATH AND COMPOSITION THEREFOR

Charles Thomas Hughes, Naperville, Ill., assignor to E. I. du Pont de Nemours and Company, Wilmington, Del.

Filed Mar. 11, 1970, Ser. No. 18,695
Int. Cl. D06p *5/04*
U.S. Cl. 8—171
No Drawing. 12 Pages Specification

Benzaldehyde and a non-ionic surface active agent selected from the group consisting of (1) a substantially neutral reaction product of an alkyl acid phosphate and ethylene or propylene oxide and (2) a block polymer consisting of the reaction product of a polyoxypropylene having a molecular weight of from about 1700 to about 2100 and ethylene oxide produces a stable mixture that when mixed into water results in a stable highly dispersed emulsion of benzaldehyde in the water and yet has extremely low foaming characteristics upon agitation. The benzaldehyde-water emulsion is useful as a dyebath medium in high agitation dyeing techniques such as a jet-dyeing technique.